No. 721,604. PATENTED FEB. 24, 1903.
W. RASTER.
GARBAGE OR OTHER RECEPTACLE.
APPLICATION FILED NOV. 13, 1901. RENEWED OCT. 27, 1902.
NO MODEL.
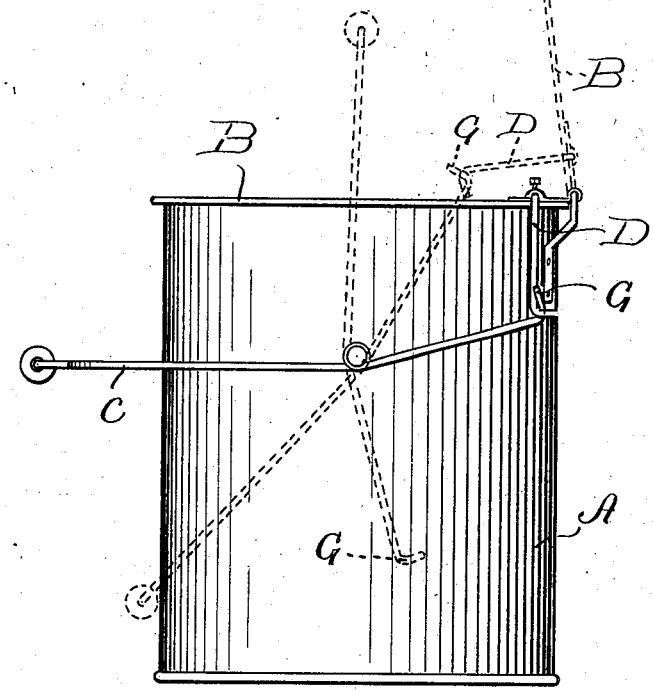
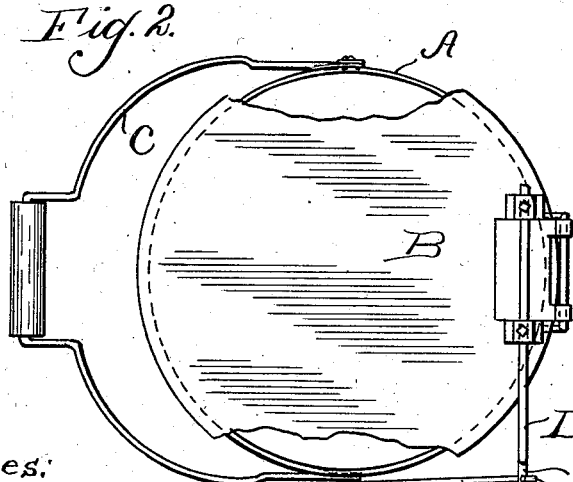

UNITED STATES PATENT OFFICE.

WALTHER RASTER, OF CHICAGO, ILLINOIS, ASSIGNOR OF ONE-HALF TO EDWIN O. RASTER, OF CHICAGO, ILLINOIS.

GARBAGE OR OTHER RECEPTACLE.

SPECIFICATION forming part of Letters Patent No. 721,604, dated February 24, 1903.

Application filed November 13, 1901. Renewed October 27, 1902. Serial No. 129,051. (No model.)

*To all whom it may concern:*

Be it known that I, WALTHER RASTER, a citizen of the United States, residing at Chicago, in the county of Cook and State of Illinois, have invented certain new and useful Improvements in Garbage or other Receptacles; and I do hereby declare the following to be a full, clear, and exact description of the invention, such as will enable others skilled in the art to which it appertains to make and use the same.

My invention relates to a novel receptacle for waste matter—such as garbage, waste paper, and the like—the object being to provide a light, portable, covered receptacle in which the cover is opened by the foot, thus leaving the hands free to place waste matter in said receptacle; and it consists in the features of construction and combinations of parts hereinafter fully described and claimed.

In the accompanying drawings, illustrating my invention, Figure 1 is a side elevation of a receptacle constructed in accordance with my invention. Fig. 2 is a top plan view of same.

The essential feature of my invention consists in making the bail by which the receptacle is carried also perform the function of a foot-lever for raising the cover, thus obviating the necessity of utilizing one hand for this purpose.

I am aware that similar receptacles have been provided with devices for raising the cover by pressure of the foot; but such devices have been applied only to large cumbersome receptacles and had no connection with the means for carrying or moving the latter.

In said drawings, A indicates a receptacle provided with a hinged cover B and with a pivoted bail C. Said cover B is provided adjacent the hinge with an arm D, extending outwardly therefrom and downwardly to extend into the path of an extension E at one end of said bail C. The lower end of the arm D is bent horizontally, as at F, to extend transversely across the path of the extension E for obvious reasons. The free end of said extension E is also bent to form a hook G, which serves when the cover is raised to the position shown in dotted lines in Fig. 1 to engage the horizontal portion F of said arm D to prevent said cover from tipping. Said bail C is adapted to normally lie in a practically horizontal position when the receptacle rests on the ground with said extension E in contact with the portion F of the arm D, as shown in full lines in Fig. 1, and by depressing the free end of said bail to the lowermost position (shown in dotted lines, Fig. 1,) to raise the cover to the position similarly indicated. By raising the bail to the vertical position (also indicated in dotted lines) said extension E will be moved out of engagement with the arm D.

My device is very handy and fills a long-felt want.

I claim as my invention—

1. The combination, with a receptacle of a hinged cover having an arm, a bail and an arm on said bail adapted when said receptacle rests on the ground to engage said arm on said cover and thereby support the handle portion of said bail above the lower limit of its movement, said bail being adapted to form a foot-lever which when depressed will raise said cover.

2. The combination, with a receptacle of a hinged cover and a bail, of an arm on said bail, an arm on said cover extending into the path of and adapted when said receptacle rests on the ground to be engaged by said arm on said bail to support the handle portion of said bail above the lower limit of its movement, said bail being adapted to form a foot-lever which when depressed will raise the cover.

3. The combination, with a receptacle of a hinged cover, a bail on the receptacle, an arm on said bail, an arm on said cover extending into the path of and adapted when said receptacle rests on the ground to be engaged by said arm on said bail to support the handle portion of said bail above the lower limit of its movement, said bail forming a foot-lever which when depressed will raise said cover, and a hook on said arm of said bail adapted when said cover is raised to engage said arm of said cover to prevent said cover from tipping rearward.

In testimony whereof I affix my signature in presence of two witnesses.

WALTHER RASTER.

Witnesses:
 RUDOLPH WM. LOTZ,
 E. F. WILSON.